(12) United States Patent
Dewberry

(10) Patent No.: US 6,668,463 B2
(45) Date of Patent: Dec. 30, 2003

(54) GROUT REMOVING TOOL

(75) Inventor: Andrew Terrance Kevin Dewberry, Vancouver (CA)

(73) Assignee: Vancouver Tool Corporation, Vancouver (CA)

( * ) Notice: Subject to any disclaimer, the term of this patent is extended or adjusted under 35 U.S.C. 154(b) by 0 days.

(21) Appl. No.: 10/010,045

(22) Filed: Nov. 30, 2001

(65) Prior Publication Data

US 2003/0101595 A1 Jun. 5, 2003

(51) Int. Cl.[7] .............................................. B26B 25/00
(52) U.S. Cl. ........................... 30/500; 15/236.1; 30/389
(58) Field of Search .......................... 30/389, 276, 164, 30/560; 83/591; 15/236.1

(56) References Cited

U.S. PATENT DOCUMENTS

| | | | |
|---|---|---|---|
| 462,073 A | * | 10/1891 | Beauregard .................. 83/591 |
| 1,751,174 A | | 3/1930 | Richards et al. |
| 2,344,955 A | | 3/1944 | Aber |
| 3,468,351 A | * | 9/1969 | Ehlen ........................... 30/389 |
| 4,064,588 A | | 12/1977 | Cooper |
| 4,155,142 A | | 5/1979 | Demetriadis |
| 4,156,966 A | | 6/1979 | Eubank |
| 4,322,989 A | | 4/1982 | Garolis |
| 4,435,923 A | | 3/1984 | Regina |
| 4,481,689 A | | 11/1984 | Westmoreland |
| 4,685,848 A | | 8/1987 | Langer |
| 4,972,589 A | | 11/1990 | Povleski |
| 4,984,369 A | | 1/1991 | Flint et al. |
| 5,566,768 A | | 10/1996 | Bourke |
| 5,596,810 A | | 1/1997 | Neubert et al. |
| 5,651,727 A | | 7/1997 | Weinstein et al. |
| 5,870,827 A | * | 2/1999 | Holst ........................ 30/500 X |
| 6,023,811 A | | 2/2000 | Ciarrocchi |
| 6,089,331 A | | 7/2000 | Christ |
| 6,149,510 A | | 11/2000 | Romagnoli |

FOREIGN PATENT DOCUMENTS

| | | |
|---|---|---|
| DE | 20621 | 12/1882 |
| DE | 847125 | 8/1952 |
| DE | 1712251 | 4/1953 |
| DE | 7345350 | 6/1974 |

\* cited by examiner

*Primary Examiner*—Douglas D. Watts
(74) *Attorney, Agent, or Firm*—Graybeal Jackson Haley LLP

(57) ABSTRACT

A cutting and grinding tool for removing grout from between tiles comprises a rotatable cutting disc formed with a plurality of radially extending teeth about the circumference of the disc. A drive gear engagable with the teeth is rotated by a power drill to exert a drive force to rotate the cutting disc. The disc teeth serve a dual function of performing a cutting and grinding operation and transmitting the drive force of the drive gear to rotate to the disc. The tool is simple in construction, reliable in operation and easy to control in order to efficiently remove grout from between tiles.

19 Claims, 3 Drawing Sheets

GROUT REMOVING TOOL

FIELD OF THE INVENTION

This invention relates to a cutting and grinding tool that is particularly suited for removing grout from between tiles.

BACKGROUND OF THE INVENTION

Grout is an initially fluid mortar material that is used to fill in the gaps between tiles where it hardens into a durable, protective and decorative layer between the tiles. When repair or replacement of a tiled surfaces is desired, it is generally necessary to remove the grout lines between the tiles. Various tools have been developed to accomplish this task including grout saws, abrading tools and chisels to cut, abrade or chip away the grout lines.

Hand tools have been specifically developed to remove grout which generally work by being moved back and forth along the grout line to abrade away the grout material. A hammer and chisel are also commonly used. These tools tend to require a great deal of manual labour.

Power tools with grout removal attachments are also known. The attachments tend to rely on reciprocating or rotating of a cutting or grinding surface over the grout lines. While power tools with attachments are faster, they are also more expensive and the user must carefully control the attachments to avoid damaging the tiles. In additional, the attachments tend to be prone to breakage and failure.

SUMMARY OF THE INVENTION

The present invention provides a cutting and grinding tool particularly suited for removal of grout that is of very simple and reliable construction to minimize breakage problems. The tool is used in conjunction with a conventional drill to provide rotary motion for driving the cutting wheel of the tool. The tool is easy to control and removes grout lines at speeds much faster than is possible with manual equipment.

Accordingly, the present invention provides a cutting and grinding tool comprising:

a rotatable cutting disc formed with a plurality of radially extending teeth about the circumference of the disc;

a drive gear engagable with the teeth to exert a drive force to rotate the cutting disc whereby the disc teeth serve a dual function of performing a cutting and grinding operation and transmitting the drive force of the drive gear to rotate to the disc.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
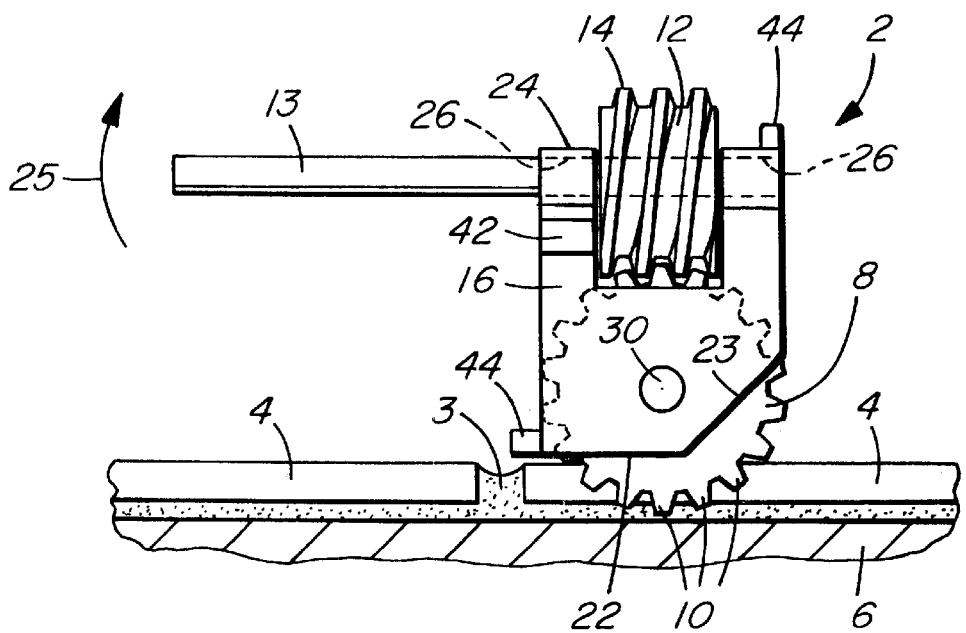
FIG. 1 is a side elevation view of a cutting and grinding tool according to a first embodiment of the invention.
Figure 2:
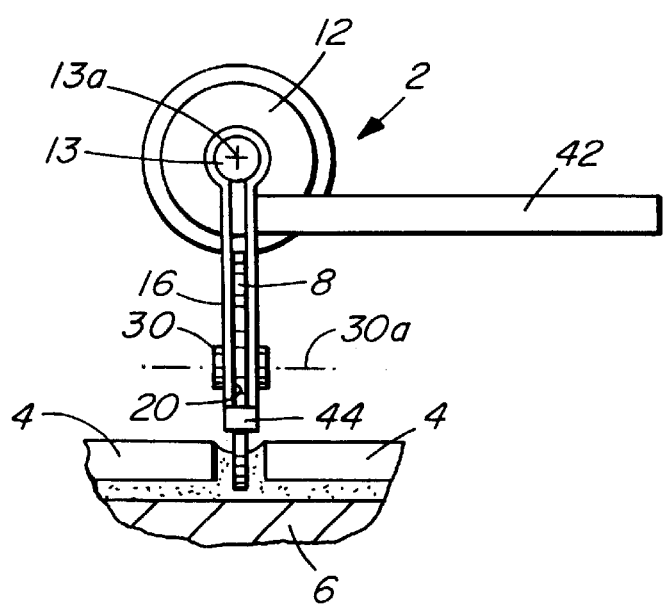
FIG. 2 is a rear elevation view of the tool of FIG. 1.
Figure 3:
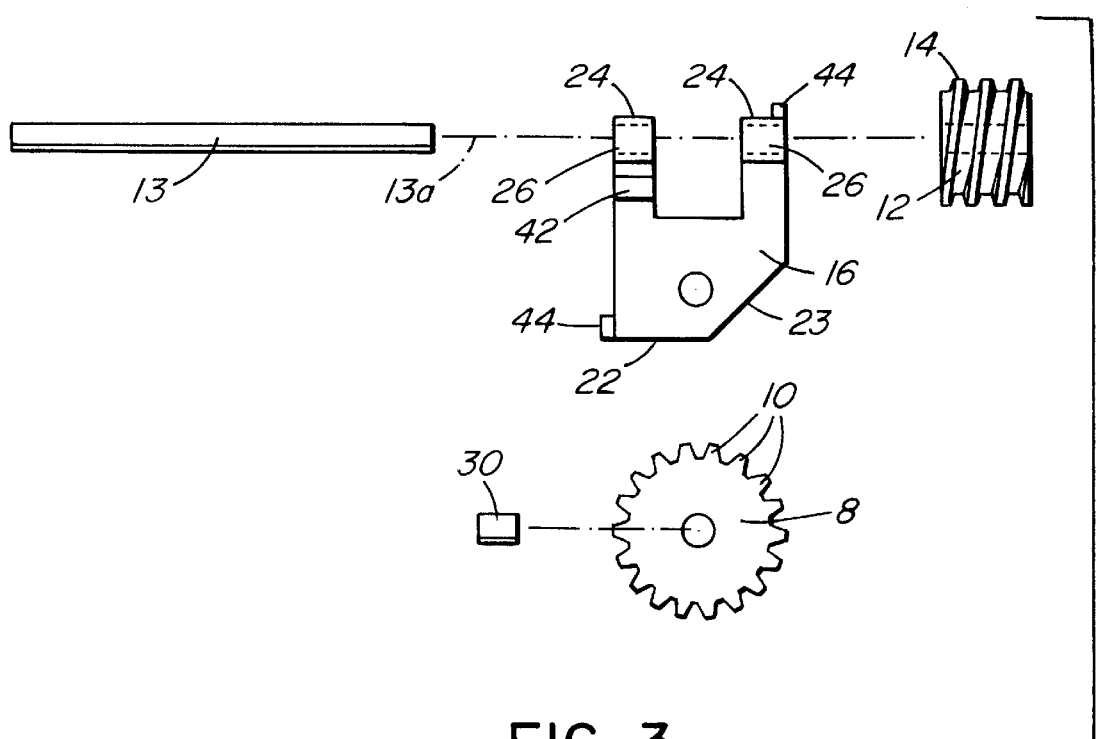
FIG. 3 is an exploded view showing the component parts of the tool of FIG. 1.

Referring to FIGS. 1–3, there is shown a cutting and grinding tool 2 according to a first embodiment of the present invention for removing grout 3 from the spaces between tiles 4. Tiles 4 are mounted by a suitable adhesive to an underlying surface 6 and the tool acts to remove the grout to the desired depth.

Cutting and grinding tool 6 includes a rotatable cutting disc 8 formed with a plurality of radially extending teeth 10 about the circumference of the disc. Cutting disc 8 is preferably a gear wheel. Drive means in the form of cylindrical drive gear 12 having an external screw thread 14 is positioned adjacent to cutting disc 8 such that the screw thread engages with the teeth 10 of cutting disc 8 in a worm gear arrangement. Drive gear 12 is fixedly mounted to a shaft 13. Gear 12 and cutting disc 8 are maintained in position with respect to each other by a housing 16 that is formed from a thin piece of material folded over on itself to define a narrow cavity 20 therebetween to hold cutting disc 8. The lower edge 22 of the housing is open to permit a portion of cutting disc 8 to protrude. The lower edge is preferably formed with an angled cut 23 to allow the tool to be pivoted (as indicated by arrow 25) to an angle as it is run along a grout line within the space between the tiles with clearance between the housing and the tiles. The upper edge 24 of housing 16 is bent into a generally cylindrical shape to define bearing surfaces 26 to rotatably retain shaft 13. A generally rectangular cut out is provided to accommodate gear 12 for rotation with shaft 13.

Housing 16 acts to retain cutting disc 8 and drive gear 12 in driving engagement with each other. Gear 12 is supported for rotation about a first axis 13a defined by shaft 13. Cutting disc 8 is similarly supported for rotation within cavity 20 of housing 16 by axle 30 which defines a second axis 30a substantially perpendicular to first axis 13a (FIG. 2). The ends of axle 30 are supported by housing 16 on opposite sides of cavity 20. On rotation of shaft 13, drive gear 12 exerts a drive force to the teeth 10 at a first region adjacent upper edge 24 of housing 16. At the same time, the teeth 10 extending from the lower edge 22 of housing 16 in a second region perform a cutting and grinding action as best illustrated in FIG. 1. Teeth 10 of cutting disc 8 thereby serve a dual function of performing a cutting and grinding operation and transmitting the drive force of the drive gear. The structure of the present invention is simple, sturdy and reliable and acts to efficiently convert rotation of shaft 13 to a grinding and cutting action that removes grout from between tiles.

The component parts of the tool are preferably formed from steel. The cylindrical drive gear 12 and the cutting disc 8 are preferably case hardened to withstand their operating environment. Housing 16 can be formed from materials such as ceramic, die-cast alloy, fibre-filled plastic or cast iron. Mild steel is a preferred material for the housing.

In use, the tool of the present invention is attached to a conventional power drill by clamping the free end 40 of shaft 13 in the drill chuck. The user holds and operates the drill and guides the tool along a grout line. By adjusting the pressure applied, the user can readily control the depth of grout removed. A conventional power drill will rotate shaft 13 and gear 12 at speeds of 3,000–5,000 revolutions per minute. The gear ratio between screw thread 14 and the gear wheel that comprises cutting disc 8 is preferably selected such that cutting disc 8 rotates at 120–300 revolutions per minute which has been found to be effective in removing grout while readily permitting control by the user.

To assist in guiding the movement of the tool along a grout line, housing 16 is preferably formed with a handle 42 (FIG. 2) extending from a side of the housing generally parallel to axle 30. The user holds and operates the power drill (not shown) with one hand while the other hand grasps handle 42 to steady and guide the tool to ensure that cutting disc 8 does not stray from a grout line.

Housing 16 can also be formed with sight members 44 at the top front edge and the lower rear edge 22. These sight member are simply raised projections which can be aligned by the user with a grout line to assist in guiding the tool.

Figure 4:
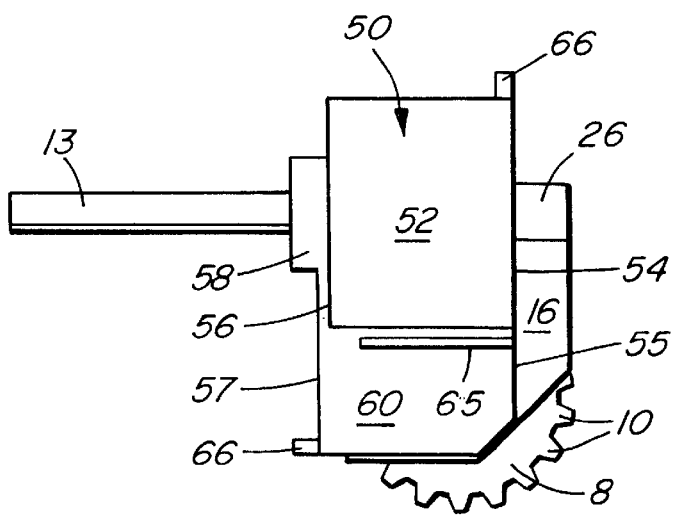
FIG. 4 is a side elevation of a cutting and grinding tool according to a second embodiment having a protective cover.
Figure 5:
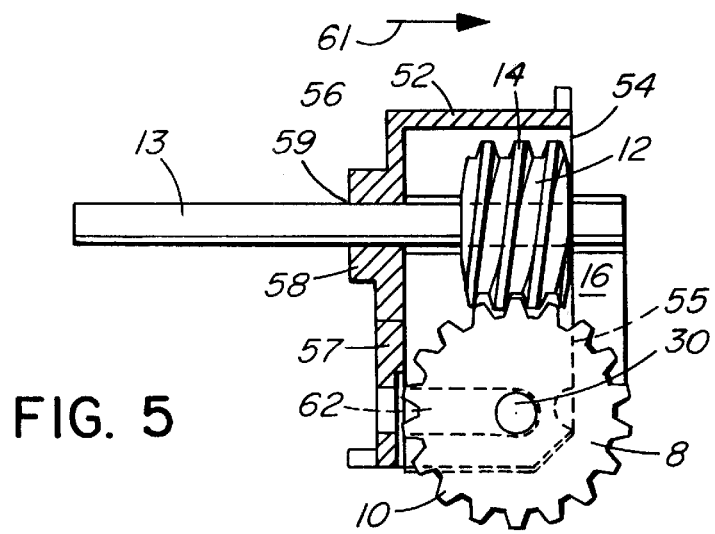
FIG. 5 is a partially sectioned elevation view through the cover of the tool illustrated in FIG. 4.

FIGS. 4 to 7 illustrate a second embodiment of the present invention which incorporates a protective cover 50 over the moving parts of the assembly. Cover 50 includes a generally cylindrical portion 52 adapted to enclose cylindrical drive gear 12 to prevent the fingers of the user from coming into contact with the spinning drive gear. Cylindrical portion 52 has an open front face 54 and a closed rear face 56 with an annular projection 58 formed with opening 59 to accommodate shaft 13 for rotation. A generally rectangular skirt portion 60 extends downwardly from cylindrical portion 52 having an internal slot in communication with the interior of cylindrical portion 52 with an open front slot edge 55 and a closed rear slot edge 57. Skirt portion 60 receives housing 16 within the internal slot such that the skirt portion overlies housing 16. As best shown in FIG. 5 which is a cross-sectional view through cover 50, the walls of skirt portion 60 are preferably formed with cavities 62 adapted to clip in place over the ends of axle 30 to retain the cover in place over the underlying steel components of the tool. The cover is installed by sliding cover 50 with open front face 54 and open front slot edge 55 over shaft 13 which is aligned to pass through opening 59 and over housing 16 and drive gear 12 until the ends of axle 30 snap into place within cavities 62. This sliding movement is in the direction of arrow 61 in FIG. 5. To accommodate flexing of skirt portion 60 to move over the ends of axle 30, slots 65 are provided as best shown in FIG. 4. Cover 50 is preferably die moulded from resilient plastic.

Figure 6:
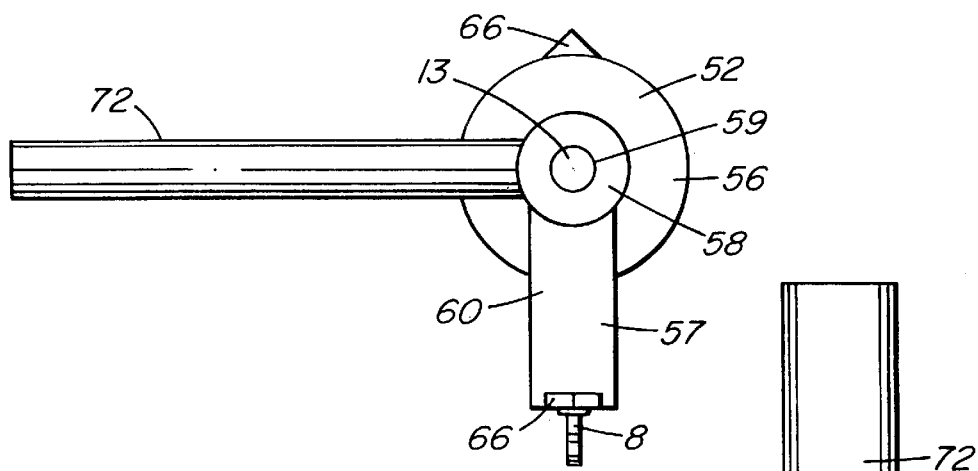
FIG. 6 is a rear elevation view of the tool of FIG. 4.
Figure 7:
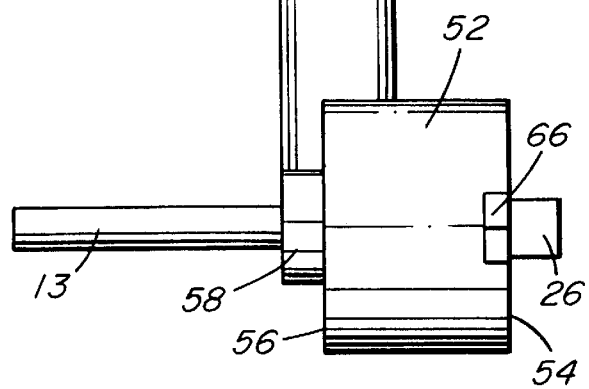
FIG. 7 is a top plan view of the tool of FIG. 4.

The cover of FIGS. 4 to 7 is fittable over the tool of the first embodiment without sighting guides 26 or handle 42. Referring to FIGS. 6 and 7, cover 50 is preferably formed with its own handle 72 extending outwardly from the cover equivalent to handle 42 of the first embodiment. Cover 50 is also preferably formed with its own sighting projections 66 atop cylindrical portion 52 adjacent open front face 54 and extending rearwardly from the rear closed edge 57 of skirt portion 60 to assist in guiding the apparatus along a grout line.

Although the present invention has been described in some detail by way of example for purposes of clarity and understanding, it will be apparent that certain changes and modifications may be practised within the scope of the appended claims.

I claim:

1. A cutting and grinding tool comprising:

a rotatable cutting disc rotatable about an axis, the cutting disc being formed with a plurality of radially extending teeth about the circumference of the disc;

a drive gear rotatable about another axis substantially perpendicular to the axis of the cutting disc, the drive gear being engagable with the teeth to exert a drive force to rotate the cutting disc whereby the disc teeth serve a dual function of performing a cutting and grinding operation and transmitting the drive force of the drive gear to rotate to the disc.

2. A tool as claimed in claim 1 including a housing to retain the cutting disc and the drive gear in driving engagement.

3. A tool as claimed in claim 2 in which the drive gear is a cylindrical gear formed with a screw thread supported in the housing for rotation and the cutting disc is a gear wheel supported in the housing for rotation.

4. A tool as claimed in claim 3 in which the cylindrical gear is mounted to a shaft rotatably supported in the housing with a portion of the shaft extending from the housing for insertion into a drill chuck.

5. A tool as claimed in claim 3 in which the teeth of the gear wheel are engagable with the cylindrical gear in a first region for driving the gear wheel and the teeth of the gear wheel extend from the housing in a second region to perform the cutting and grinding operation.

6. A tool as claimed in claim 2 including a handle extending from the housing to permit a user to guide the movement of the cutting disc.

7. A tool as claimed in claim 2 in which the housing is formed from steel.

8. A tool as claimed in claim 2 including sight members extending from the housing to assist a user in guiding the tool.

9. A tool as claimed in claim 2 including a cover over the housing to shield the drive gear and cutting gear from the user.

10. A tool as claimed in claim 9 in which the cover is adapted to snap fit over the housing.

11. A tool as claimed in claim 9 including a handle extending from the cover.

12. A tool as claimed in claim 9 including sight members extending from the cover to assist a user in guiding the tool.

13. A tool as claimed in claim 1 in which the drive gear is mounted to a rotatable shaft adapted to be driven by a drill.

14. A tool as claimed in claim 1 in which the drive gear is a rotatable cylindrical gear formed with a screw thread.

15. A tool as claimed in claim 1 in which the cutting disc is a gear wheel.

16. A cutting and grinding tool comprising:

a rotatable cutting disc rotatable about an axis and formed with a plurality of radially extending teeth; and drive means rotatable about another axis generally perpendicular to the axis of the rotatable cutting disc, the drive means being engagable with the teeth to exert a drive force to rotate the cutting disc whereby the teeth serve a dual function of performing a cutting and grinding operation and transmitting the drive force of the drive means to rotate to the disc.

17. A tool as claimed in claim 16 in which the drive means comprises a drive gear.

18. A tool as claimed in claim 17 in which the drive gear comprises a cylindrical gear with a screw thread.

19. A tool as claimed in claim 16 in which the cutting disc comprises a gear wheel.

* * * * *